United States Patent Office 3,539,486
Patented Nov. 10, 1970

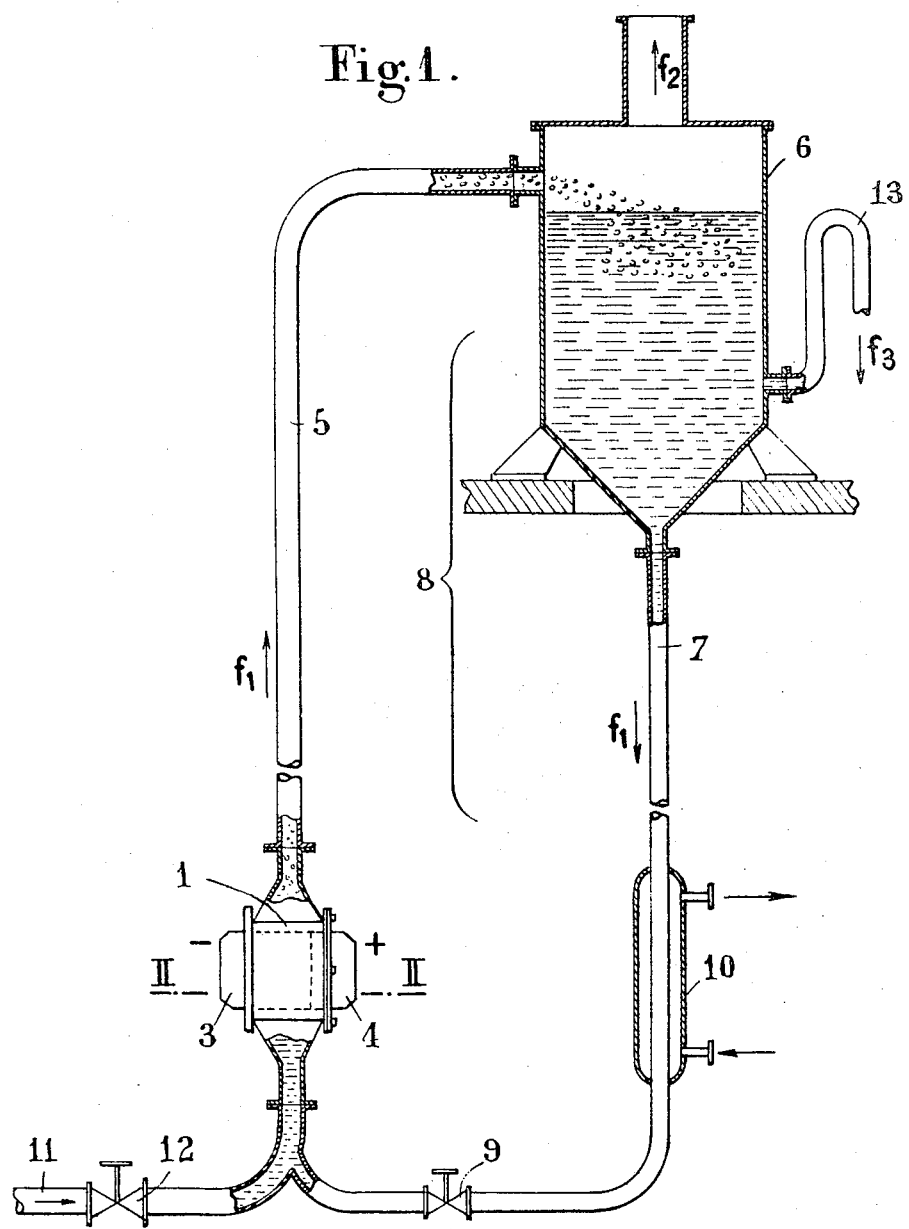
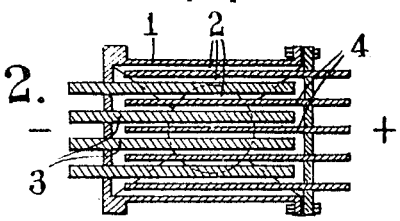

3,539,486
METHOD OF ELECTROLYTICALLY PRODUCING ALKALINE CHLORATES
Jacques Fleck, Kehl, Germany, assignor to Krebs & Cie Paris, Societe Anonyme, Paris, France
Filed Sept. 12, 1967, Ser. No. 667,183
Claims priority, application France, Sept. 14, 1966, 76,352
Int. Cl. C01b *11/14*
U.S. Cl. 204—95   5 Claims

ABSTRACT OF THE DISCLOSURE

A method of electrolytically producing alkaline chlorates from aqueous solutions of the corresponding chlorides, wherein the main steps of electrolytically decomposing the chloride dissolved in water into chlorine, hydrogen and alkali, effecting the chemical combination of the electrolysis products into hypochlorite and, with the assistance of water, into hypochlorous acid, and the likewise chemical transformation of hypochlorite and hypochlorous acid into chlorate are caused to take place as far as possible in successive zones so interconnected as to constitute a cyclic system through which the electrolyte is caused to flow.

BACKGROUND OF THE INVENTION

Alkaline chlorates have well-known applications, inter alia, they are suitable as oxidizers and as raw material in the manufacture of chlorine dioxide, as a cellulose fibres bleaching agent, and furthermore they are used in the composition of herbicidal products, matches propergols, etc.

The so-called electrolytic process for manufacturing chlorates from their chlorides in an aqueous medium pertains to the electrochemical technique only with respect to the release of chlorine ions at the anode and hydrogen ions at the cathode, under the influence of the electrical direct current, within the electrolyte by the release of hydrogen and of an equivalent quantity of hydroxyl ions, the building up of chlorate from the chlorine and the hydroxyl ions taking place secondarily with the participation of water through a purely chemical process involving the intermediate stages of hypochlorous acid and hypochlorite ions.

The electrochemical production of chlorate, although feasible by the release of hypochlorite ions, is not advantageous. In fact, it is attended by the release of oxygen and therefore no more than the two-thirds of the current involved are actually utilized for producing the desired chlorate.

As a result, for obtaining so-called electrolytic chlorate under the best possible economical conditions the primary requirement is to avoid its electrochemical production and this requirement cannot be met unless the electrolysis is limited to the decomposition of the dissolved chloride into chlorine, alkali and hydrogen, and the "chloratation" is conducted in such a way that it can take place only by a purely chemical process.

In this case the simplest solution would consist in separating the electrolysis from the chlorate product but this would yield chlorate having 5 chloride molecules. The electrochemical splitting of chloride and the generation of chlorate from the products of an electrolysis carried out in a common arrangement are advantageous in that it is possible to recycle the chloride regenerated during the reverse change of hypochlorite into chlorate and chloride through the cell, and thus produce solutions having a 2:3 chlorate:chloride molar ratio, this ratio not exceeding 0.2 even under the best possible conditions if an alkali chlorination method is used.

To promote the chemical generation of chlorate from hypochlorite ions and hypochlorous acid, which produces a slow reaction in comparison with the electrochemical changes and with the production of hypochlorite ions and hypochlorous acid, it is essential to properly time the electrochemical generation of chlorine and alkali with their evolution into chlorate, so that the quickly generated intermediate products, i.e. hydrochlorite and hypochlorous acid, are converted by a chemical process into chlorate before their enrichment is sufficient to enable these products to perform efficiently in the electrolytic process.

Various attempts have already been made with a view to adapt chlorate cells to this principle of synchronising or timing the different chlorate generating steps, by using large volumes of electrolyte in these cells in order to increase the residence time of the electrolyte in the portions through which no electric current flows and thus promote the chemical production of chlorate. It was with this provision that the notion of "current concentration" ratio of the electrical charge in the cell, in amperes, to the volume in litres of electrolyte contained in the cell, which is specific of chlorate cells, was introduced into the actual practice of electrolytic chlorate industry.

However, this provision and the more recent technique consisting in transferring the additional volume of electrolyte to the exterior of the cell (Krebs' process disclosed in the French Pat. No. 772,326 of 1933–34, assigned to the applicants, cf. Ullmann, 1954, vol. 5, p. 535 and in Gmelin:Natrium, supplement 1, p. 176, 1964), which are both beneficial, did not provide average faradic yields greater than 85%.

Considering the fact that chlorate can be produced from chlorine and electrolytic soda with faradic yields in excess of 95%, it is obvious that seat of the strong loss of electrochemical efficiency observed in the so-called electrolytic production of chlorate can lie only in the cell proper As the cell operates without diaphragm it behaves exactly like a hypochlorite cell, i.e. with an efficiency dropping rapidly as the hypochlorite ions concentration increases.

Therefore, theoretically, the lower the active chlorine concentration (in the form of hypochlorite and hypochlorous acid) the higher the yield of the electrolytic chlorate production process.

SUMMARY OF THE INVENTION

Since the conversion of hypochlorite and hypochlorous acid into chlorate takes place at a rate definitely lower than that of the formation of these substances from chlorine and hydroxyl ions, a desirable reduction in the active chlorine concentration not only requires an increment in the electrolyte flow rate through the cell but also and primarily the time during which the electrolyte circulates outside the cell, that is, through the reactors, must be sufficient to enable the active chlorine to be transformed into chlorate from the lowest possible active chlorine threshold. This hypochlorite threshold will be determined firstly by the capacity of the system to transform active chlorine into chlorate.

The applicants, inspired on the one hand by their experience gained in the actual construction and exploitation of chlorate cells and on the other hand by the results of an exhaustive study of the optimum conditions necessary for carrying out the essential steps of a chlorate production process, discovered that far better yields could be obtained by using a method constituting a nearer approach to the production of chlorate apart from the electrolysis, while avoiding the inconvenience of an abnormally low chloride-to-chlorate conversion rate.

The present invention consists broadly in separating as much as possible the three essential steps of chlorate production, namely:

The electrolytic decomposition of chloride dissolved in water into chlorine hydrogen and alkali;

The chemical production of hypochlorite and hypochlorous acid;

The transformation thereof, also by a chemical process, into chlorate, these steps taking place in successive zones consisting in actual practice of discrete elements of an apparatus, each element being designed and constructed for the specific process which is to take place therein, said elements being assembled to constitute a cyclic system through which the electrolyte is caused to flow, one of said zones being an electrolysis zone embodied as an electrolytic cell in which said electrolytic decomposition takes place.

Other characteristic features of the method of this invention are set forth hereinafter.

In the above-defined cyclic system the electrolyte circulation is maintained by taking advantage of the lifting force of the hydrogen bubbles released during the electrolysis;

The cycle-forming discrete elements of the apparatus are each designed with such shapes and dimensions that the resulting rate of flow of the electrolyte (residence time) enables the corresponding process to take place under the best possible yield conditions;

The cell operating under pressure and without any diaphragm is submerged in the electrolyte containing a great number of fine hydrogen bubbles; therefore, the cell has no gaseous space of its own;

The cell can be operated under current density values hitherto deemed rehibitory, both with impregnated graphite anodes and with, more particularly, anodes of activated-graphite, activated titanium, or other suitable and activated metals.

The yields obtained under these conditions exceed 90% and given a same output or production rate as with prior art methods, the overall dimensions of the apparatus are smaller.

The theoretical bases of the method of this invention are illustrated through the following practical examples:

An electrolytic cell included in the cyclic system of this invention, having an electrical capacity of 10 ka. and operating with a current density of 30 amp. per sq. decimeter at a temperature of 60° C. with 600-millimeter high activated titanium anodes paired with steel cathodes so as to leave interpolar gaps of 5 millimeters therebetween is fed with electrolyte at a flow rate of 0.60 meter/second. As the surface area of the interpolar gaps is 2.78 sq. dm., the electrolyte output corresponding to said 0.60 m./s. speed is 1 cu. m./mn. As the volume of the chambers or spaces through which the current flows is only 16.7 litres, it can be disregarded as a negligible value in the calculation.

As the theoretical chlorine production expressed in sodium hypochlorite is 0.282 kg./mn., the increment in sodium hypochlorite concentration during the passage through the cell will be 0.232 g./l.

Since from measurements made by the applicants it is possible to convert hypochlorite at 60° C. and under a pH value ranging from 6.0 to 6.8 into chlorate in 1, 2, 3, 4, and 6 mn. at the rate of 10.3%, 19.4%, 27.5%, 34.8% and 47.6% of its initial value, the active chlorine concentration of the electrolyte expressed in sodium hypochlorite at the cell outlet (hypochlorite threshold) according to its residence time outside the cell, will be as follows:

| Residence time (mn.): | Hypochlorite threshold [1] |
|---|---|
| 1 | 2.25 |
| 2 | 1.2 |
| 3 | 0.84 |
| 4 | 0.67 |

[1] G./l. NaOCl.

To obtain this residence time the volume of the reactors outside the cell should be respectively of 1  2  3  4 cu. m.

corresponding to a current concentration (in proportion to the volume of the reactors which in this case is comparable to the total volume of electrolyte in circulation) of respectively 10  5  3.3  2.5 amp./l.

If under the same temperature and charge conditions the rate of flow of the electrolyte through the cell were reduced to 0.3 m./s. corresponding to an output of 500 l./m., the respective volumes of the reactors would be 1, 2 and 3 cu. m. giving the following corresponding values for the current concentrations, residence time periods and hypochlorite thresholds:

| Reactor volumes, cu. m | 1 | 2 | 3 |
|---|---|---|---|
| Current concentration, amp./l | 10 | 5 | 3.3 |
| Residence time, mn | 2 | 4 | 6 |
| Hypochlorite threshold, G./l. NaOCl | 2.39 | 1.33 | 0.97 |

At 167 l./mn. the electrolyte output through the cyclic system corresponding to a speed of 0.1 m./s. in the cell, the hypochlorite threshold at a 10 amp./l. current concentration would rise to 2.92 g./l. of NaClO, although the residence time of the electrolyte outside the chambers or spaces through which said current flows is 6 mn., as compared with 2 mn. at 0.8 m./s. and 1 mn. at 0.3 m./s. of flow speed through the cell.

The foregoing confirms that the residence time of the electrolyte outside the cell, i.e. the current concentration of the cyclic system, exerts a far greater influence on the hypochlorite threshold than the electrolyte flow rate in the cell. Whilst the hypochlorite threshold can be lowered at will by reducing the current concentration, the lowering of the hypochlorite threshold which is caused by an increase in the electrolyte flow rate is rapidly dissipated at a given current concentration.

At 60° C. and 10 amp./l. current concentration the hypochlorite thresholds at increasing electrolyte flow rates through the above-described cell are as follows:

| Flow rate (m./s.): | Hypochlorite threshold [1] |
|---|---|
| 0.1 | 2.92 |
| 0.3 | 2.39 |
| 0.6 | 2.25 |
| 1.2 | 2.21 |

[1] G./l. NaClO.

Whilst the change from 0.1 to 0.3 m./s. in the electrolyte flow rate through the cell still produces a reduction in the hypochlorite threshold of slightly more than 8%, the consequence of a change from 0.3 to 0.6 m./s. and from 0.6 to 1.2 m./s. respectively is only a 6% reduction and less than a 2% reduction, respectively.

If the temperature is 40° C., the percentage of hypochlorite converted into chlorate in 1, 2, 3, 4, and 5 mn. is only 3.3, 6.5, 9.9, 13.1, and 16.1%, therefore, to operate under the same low hypochlorite threshold in the system as at 60° C. the volume of the reactors must be considerably greater.

However, since the losses of yield in the production of hypochlorite drop in proportion to the temperature, the cell can be operated at 40° C. with a higher hypochlorite threshold than at 60° C.

From the foregoing and from complementary research works carried out by the Applicants it appears that, provided that a low hypochlorite concentration is warranted in the cell (of the order of 2 g./l. at 60° C.), it is possible to obtain a 95% chlorate yield and even more in a cyclic system according to this invention by using a cell without diaphragm, the maximum volumetric oxygen content of the hydrogen being 2%.

The use of diaphragms is not precluded but the yield improvement likely to be expected therefrom is far too small to compensate the increase in the electric voltage and the cost resulting from the use of such diaphragms.

Regarding the electrolyte feeding the cyclic system according to this invention, it can be the saturated sodium chloride solution only when the system is being started, unless the final solution is used integrally. In all other cases the feed electrolyte will contain, in addition to chloride, a chlorate proportion corresponding to the consumption of chlorate electrolyte prepared in the system, i.e. to the composition of the mother liquors to be recycled. According as the chlorate is used for preparing chlorate crystals by evaporation and subsequent cooling, or by cooling alone, or as it is used in the production of chlorine dioxide by the hydrochloric acid reduction of chlorate, the electrolyte fed to the system will contain from 170 to 250 g./l. of chloride and 100 to 450 g./l. of chlorate.

DESCRIPTION OF THE DRAWING

The attached drawing illustrates diagrammatically one of the possible forms of embodiment of an apparatus for carrying out the method of this invention. In the drawing:

FIG. 1 is a vertical section;

FIG. 2 is a horizontal section showing on a larger scale the electrolytic cell, the section being taken along the line II—II of FIG. 1.

The cell 1 inserted in the lower portion of the cycle of elements according to this invention has the form of a duct open at the bottom and top, and consisting of an assembly of vertical, slot-shaped channels 2 of a width ranging from about 2 to about 10 mm., and bound laterally by the electrodes (cathodes 3 and anodes 4) but open in the vertical direction is fed with an upward stream of moderately acid dichromate-containing electrolyte filling the cell completely. The fluid path followed by the electrolyte in the system, as shown by the arrows $f_1$, is maintained by the lifting force of the hydrogen bubbles released during the electrolysis and is set at a rate sufficient to keep the anode-produced chlorine in solution,
prevent the hydrogen bubbles from forming a screen on the cathode and remaining stuck thereto,
limit the residence time of the electrolyte in the cell to prevent the hydroxyl and hypochlorite ions from participating to a pronounced degree in the anode phenomena, or the hypochlorite ions from being reduced at the cathode.

The electrolyte flowing from the cell and containing the products of the electrolysis which have not been transformed completely into hypochlorite and hypochlorous acid subsequently flows into a zone wherein this transformation is completed. This zone 5 where the chlorate production has already commenced consists of a vertical pipe leading into the hydrogen separator 6 and the electrolyte flows therethrough at a rate at least equal to that prevailing in the cell. As it is poured into the hydrogen separator 6 of greater cross-sectional area with respect to the zone 5 the electrolyte is degassed, the hydrogen escaping along the path shown by the arrow $f_2$ towards the consumer stands or the like.

The lower portion of separator 6 and the pipe 7 for returning the electrolyte to the cell constitute the essential portion of the so-called "chloratation" zone of the system, in which the transformation of hypochlorite and hypochlorous acid into chlorate is continued, with a strongly reduced electrolyte flow rate, until the residual concentration of active chlorine corresponding to the desired hypochlorite threshold is attained. The active chlorine concentration in the electrolyte flowing back to the cell through said pipe 7 equipped with a valve 9 is set by the ratio of the flow rate through the cell 1 to the flow rate through said zone 8.

The pipe for returning the electrolyte to the cell is equipped with a heat transfer device 10 whereby the heat thus developed can be dissipated and the proper temperature conditions can be set up within the system.

Pick-up and valve means are provided in the system for:

introducing fresh electrolyte, possibly acidulated by using hydrochloric acid (pipe 11 provided with a valve 12),
picking up samples for analysis purposes (the pick-up holes are not shown),
drawing off chlorate solution through an overflow pipe 13 in the direction of the arrow $f_3$.

DESCRIPTION OF THE PREFERRED EMBODIMENTS

Typical examples illustrating the satisfactory yields obtained with the method of this invention are described hereinafter:

EXAMPLE 1

A cyclic system according to this invention, which comprises a cell provided with steel cathodes and impregnated graphite anodes (with a 5 mm. interpolar gap), operated with a 15 amp./sq. dm. current density at the anode and at 40° C., produces sodium chlorate with a 91% current yield, under an average voltage of 3.3 v. across the cell terminals, by using an electrolyte containing 4 g./l. of sodium dichromate and kept at a pH value of 6.3, this electrolyte flowing through the cell at the speed of 0.3 m./s. and containing initially 225 g./l. of sodium chloride per 100 g./l. of sodium chlorate and 105 g./l. of chloride per 450 g./l. of chlorate at the end of the run, the maximum electrolyte level being maintained by adding sodium chloride electrolyte through the pipe 11. The "current concentration" is 10 amp./l.

EXAMPLE 2

A cyclic system according to this invention, which comprises a cell provided with steel cathode and titanium anodes activated by a coating of platinum and iridium in the ratio of 7:3 thereon by reason of 20 g./sq. m. (the interpolar gap being 5 mm.), said cell being operated wtih an anode current density of 30 amp. /sq. dm. and at a temperature of 60° C., produces chlorate with a 95% current yield, under the average voltage of 3.1 v. across the cell terminals, by using an electrolyte containing 3 g./l. of Na2Cr2O7 kept at a pH value of 6, flowing through the cell at the speed of 0.3 m./s. and containing 288 g./l. of chloride per 481 g./l. of chlorate at the end of the run, the maximum electrolyte level being maintained by adding sodium chloride electrolyte through the pipe 11. The "current concentration" is 10 amp./l.

EXAMPLE 3

In a cyclic system according to this invention, which comprises a 6 ka. cell equipped with electrodes spaced 5 mm. apart, i.e. steel cathodes and anodes of titanium activated by a coating of platinum and iridium in the ratio of 7:3 by reason of 20 g./sq. m., operated at a current density of 33 amp./sq. dm. and at 60° C., a chlorate solution containing 625 g./l. of sodium chlorate per 96 g./l. of sodium chloride, is prepared as a continuous process by feeding the system with saturated sodium chloride electrolyte.

The voltage was 3.3 v. in the average and the oxygen in the hydrogen was 1% to 2% by volume. The "current concentration" was of the order of 10 amp./l., the electrolyte flowing through the cell at the speed of 0.45 m./s., the sodium dichromate concentration being 3.5 g./l. The pH value of the electrolyte circulating through the system was found to range from 6.0 to 6.3 at the cell inlet.

The above examples merely illustrate the possibilities afforded by the method of the present invention but should not be considered as limiting the invention. Thus, the cell may be operated at higher current density values, especially if it is provided with adequate metal anodes. In this case the other operating conditions should be selected with a view to keep the possible generation of perchlorate within reasonable limits. Current density values up to 20 amp./sq. dm., with graphite anodes, and up to 100 amp./sq. dm. with activated titanium anodes, which are theoretically permissible, are adequate from the purely economical point of view only if electric power is available at a relatively low cost.

If the operation of a series of cells is contemplated the separate reactor system associated with each cell, as shown in diagrammatic form in the attached drawing, may be replaced by a reactor system common to a plurality or the whole of the cells and having suitable dimensions.

In the case of a structure comprising a plurality of cell-and-reactor cyclic systems, the method of this invention is applicable both to the parallel supply of electrolyte and to the series supply of electrolyte to systems or groups of systems. In the first case (parallel feed) all the systems operate with a chloride and chlorate concentration close to the final concentration of the chlorate solution, and in the second case (series feed) the composition of the electrolyte changes stepwise from one system to another, i.e. from a concentration close to the initial feed electrolyte concentration to the final concentration of the chlorate electrolyte.

The series feed is advantageous in that the voltage across the cell terminals increases as the chloride concentration of the electrolyte decreases.

Obviously, the chloride content of the electrolyte may be increased during the production run by re-saturating same, i.e. by diverting one fraction of the electrolyte by means of a saturator and introducing fresh chloride into the existing circuit.

What I claim is:
1. A method of electrolytically producing alkaline chlorates from aqueous solutions of the corresponding chlorides, which comprises three principal reactions of electrolytically decomposing the chloride which is dissolved in water to form electrolysis products including chlorine, hydrogen and alkali, effecting the chemical combination of the electrolysis products in the presence of water into hypochlorite and hypochlorous acid, and effecting the chemical transformation of hypochlorite and hypochlorous acid into chlorate, the improvement which comprises circulating the electrolyte in three successive zones of a cyclic system whereby said three reactions are effected in said three successive zones, one of said zones being an electrolysis zone embodied by an electrolytic cell in which said electrolytic decomposition takes place, said electrolysis zone having the general configuration of a duct open at the bottom and top, which comprises juxtaposed slot-shaped vertical channels of a width ranging from about 2 to about 10 mm., said channels being bound laterally by the electrodes and receiving the upward stream of electrolyte which flows at a speed ranging from about 0.3 m./s. to about 0.6 m./s., the residence time of the electrolyte outside the electrolysis zone ranging from about 1 min. to about 4 min. and the proportion of active chlorine in the electrolyte at the outlet of said electrolysis zone being lower than 4.5 g./l.

2. A method as set forth in claim 1, wherein the electrolyte circulation through the cyclic system is produced by the lifting force of the hydrogen released during the electrolysis.

3. A method as set forth in claim 2, wherein the electrolysis zone operates under pressure, and is filled completely with electrolyte loaded with fine hydrogen bubbles.

4. A method as set forth in claim 3, wherein said electrolysis is carried out in the electrolysis zone with current densities at the anode of up to 20 amp./sq. dm., the anodes used being graphite anodes.

5. A method as set forth in claim 3, wherein said electrolysis is carried out in the electrolysis zone with current densities at the anode of up to 100 amp./sq. dm., the anodes used being anodes of activated titanium.

References Cited
UNITED STATES PATENTS

| | | | |
|---|---|---|---|
| 665,426 | 1/1901 | Gibbs | 204—95 |
| 2,180,668 | 11/1939 | Delavenna et al. | 204—95 |
| 2,511,516 | 6/1950 | Schumacher | 204—95 |
| 2,628,935 | 2/1953 | Earnest et al. | 204—95 |
| 2,797,192 | 6/1957 | Graff et al. | 204—95 |
| 3,043,757 | 7/1962 | Holmes | 204—95 |
| 3,219,563 | 11/1965 | Collins et al. | 204—95 |
| 3,385,779 | 5/1968 | Nishiba et al. | 204—95 |
| 3,390,065 | 4/1964 | Cooper | 204—95 |

FOREIGN PATENTS

| | | |
|---|---|---|
| 513,590 | 6/1955 | Canada. |
| 741,778 | 8/1966 | Canada. |
| 772,326 | 1934 | France. |

OTHER REFERENCES

Gmelin: Natrium, Supplement 1, 1964, pp. cover and 176.

Ullmann: Encyklopadie der Technischen Chemie, 1954, vol. 5, pp. cover and 535.

ALLEN B. CURTIS, Primary Examiner

U.S. Cl. X.R.

204—237